US005745714A

United States Patent [19]
Glass et al.

[11] Patent Number: 5,745,714
[45] Date of Patent: Apr. 28, 1998

[54] METHOD AND SYSTEM IN A DATA PROCESSING SYSTEM FOR THE ASSOCIATION AND DISPLAY OF A PLURALITY OF OBJECTS

[75] Inventors: David Wayne Glass, Georgetown, Ky.; Michael David Hocker, Staatsburg, N.Y.; Gregory Tad Kishi, Oro Valley, Ariz.; James Gordon McLean, Fuguay-Varina, N.C.; Clifford Alan Pickover, Yorktown Heights, N.Y.; Daniel James Winarski, Tucson, Ariz.

[73] Assignee: International Business Machines Corporation, Armonk, N.Y.

[21] Appl. No.: 683,946

[22] Filed: Jul. 19, 1996

[51] Int. Cl.⁶ .................................................. G06F 15/00
[52] U.S. Cl. ......................... 395/339; 395/331; 395/332; 395/349
[58] Field of Search .............................. 395/326, 327, 395/328, 329, 331, 332, 333, 334, 339, 340, 343, 344, 345, 347, 348, 349, 351

[56] References Cited

U.S. PATENT DOCUMENTS

| | | | |
|---|---|---|---|
| 5,150,457 | 9/1992 | Behm et al. | 395/120 |
| 5,265,202 | 11/1993 | Krueger et al. | 395/340 |
| 5,577,125 | 11/1996 | Salahshour et al. | 380/54 |
| 5,581,670 | 12/1996 | Bier et al. | 395/326 |

*Primary Examiner*—Mark R. Powell
*Assistant Examiner*—Huynh Ba
*Attorney, Agent, or Firm*—Mark E. McBurney; Lisa B. Yociss; Andrew J. Dillion

[57] ABSTRACT

A method and system in a graphical user interface in a data processing system for associating and displaying a plurality of objects are described. A creation of a visually perceptible enclosure having a translucent surface is specified. A plurality of objects within the graphical user interface are specified. Each of the objects are associated with the visually perceptible enclosure. The enclosure is then created. The enclosure and each of its associated plurality of objects are displayed within the graphical user interface. Each of the objects are displayed within the enclosure so that they are partially visible through the translucent surface. The objects are inaccessible while they are displayed within the enclosure. Once the enclosure is removed, the objects are accessible. A code field may be associated with the enclosure. An entry of a valid code is required in order to remove the enclosure and permit access of each enclosed objects. If an invalid code is entered, the enclosure will continue to be displayed, and access of the enclosed objects will be prohibited.

20 Claims, 11 Drawing Sheets

METHOD AND SYSTEM IN A DATA PROCESSING SYSTEM FOR THE ASSOCIATION AND DISPLAY OF A PLURALITY OF OBJECTS

BACKGROUND OF THE INVENTION

1. Technical Field

The present invention related to a method and system within a graphical user interface of a data processing system for associating and displaying a plurality of objects, and in particular to the creation in a graphical user interface of a visually perceptible enclosure within which a plurality of objects are displayed. Still more particularly, the present invention relates to a method and system within a graphical user interface of data processing system for associating a plurality of objects with a visually perceptible enclosure having a translucent surface, and displaying the visually perceptible enclosure and the plurality of objects within the enclosure so that the objects are partially visible through the surface.

2. Description of the Related Art

Graphical user interfaces (GUI) are well known in the art. These interfaces include a visual metaphor, typically an iconic representation, of objects. Graphical user interfaces provide ways for users to effectively communicate with the computer. In graphical user interfaces, available applications, data sets, and other objects are often represented by icons which are small graphical representations which may be selected by a user and manipulated. These objects may include data objects, container objects, files, and applications. A user may access and manipulate these objects with a pointing device such as a mouse-controlled cursor. Icons are graphic symbols displayed on a screen which typically include a small image and a label. Once the icon is selected, the application associated with the icon is displayed and may be utilized. Icons may be represented in two-dimensional, three-dimensional, or virtual reality environments on computer screens, projections displays, or on head-mounted displays.

It is also known in the prior art to place applications in a container object. A container object is displayed to a user as an icon, a small image usually having a label. The container object may be selected by a user. Once selected, the applications included within the container object may be accessed.

Therefore a need exists for a method and system to associate and display a plurality of objects within a graphical user interface in a data processing system.

SUMMARY OF THE INVENTION

It is therefore one object of the present invention to provide a method and system within a graphical user interface of a data processing system for associating and displaying a plurality of objects.

It is another object of the present invention to provide a method and system within a data processing system for the creation in the graphical user interface of a visually perceptible enclosure within which a plurality of objects are displayed.

It is yet another object of the present invention to provide a method and system within a graphical user interface of data processing system for associating a plurality of objects with a visually perceptible enclosure having a translucent surface, and displaying the visually perceptible enclosure and the plurality of objects within the enclosure so that the objects are partially visible through the surface.

The foregoing objects are achieved as is now described. A method and system in a graphical user interface in a data processing system for associating and displaying a plurality of objects are described. A creation of a visually perceptible enclosure having a translucent surface is specified. A plurality of objects within the graphical user interface are specified. Each of the objects are associated with the visually perceptible enclosure. The enclosure is then created. The enclosure and each of its associated plurality of objects are displayed within the graphical user interface. Each of the objects are displayed within the enclosure so that they are partially visible through the translucent surface. The objects are inaccessible while they are displayed within the enclosure. Once the enclosure is removed, the objects are accessible.

A code field may be associated with the enclosures. An entry of a valid code is required in order to remove the enclosure and permit access of each enclosed objects. If an invalid code is entered, the enclosure will continue to be displayed, and access of the enclosed objects will be prohibited.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
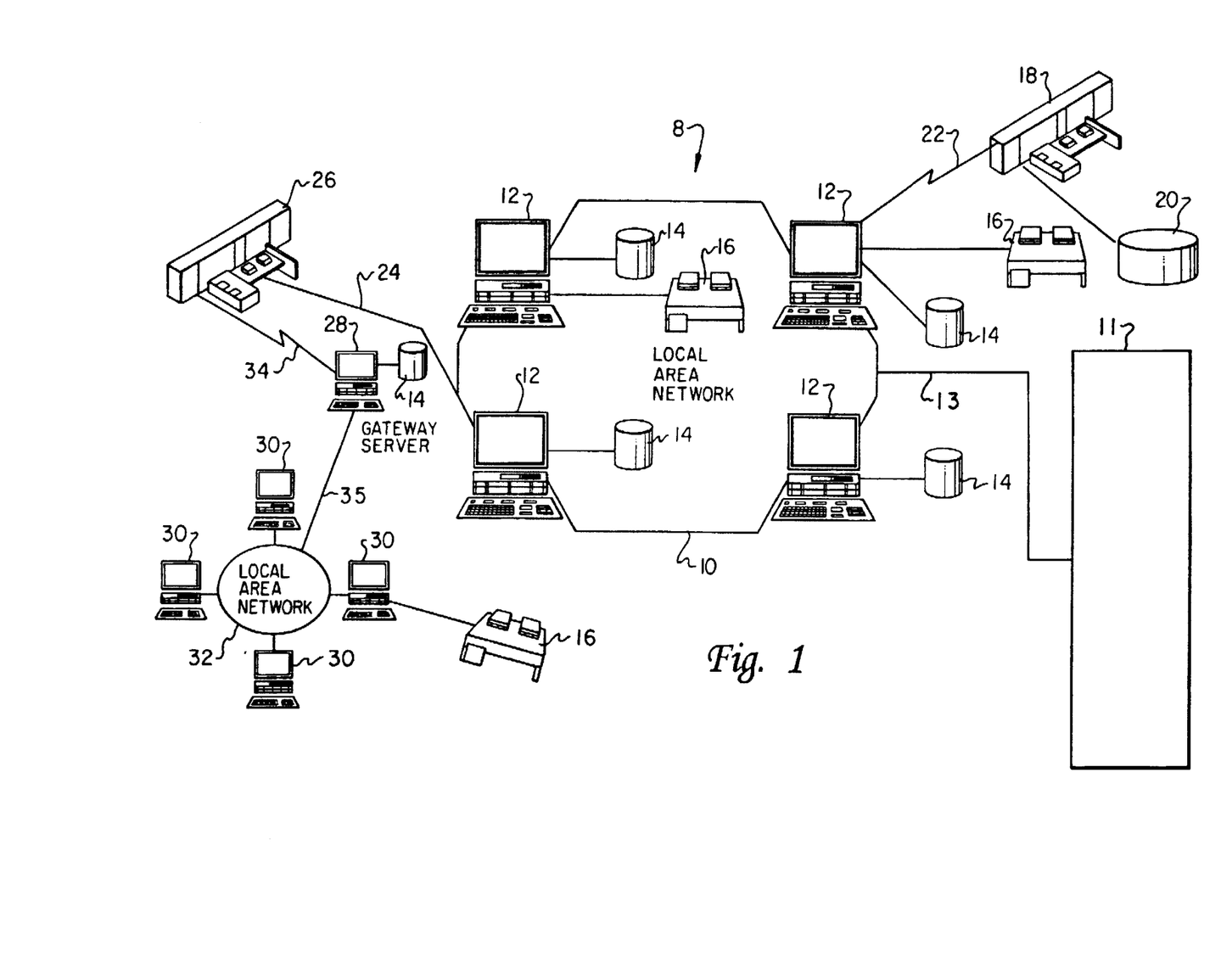
FIG. 1 depicts a pictorial representation of a data processing system which may be utilized to implement the method and system of the present invention.

With reference now to the figures and in particular with reference to FIG. 1, there is depicted a pictorial representation of a data processing system 8 which may be utilized in accordance with the method and system of the present invention. As may be seen, data processing system 8 may include a plurality of networks, such as Local Area Networks (LAN) 10 and 32, each of which preferably includes a plurality of individual computer systems 12 and 30, respectively. Of course, those skilled in the art will appreciate that a plurality of Intelligent Work Stations (IWS) coupled to a host processor may be utilized for each such network. In addition, additional data processing systems 11 may communicate with data processing system 10 via communications link 13.

As is common in such data processing systems, each individual computer may be coupled to a storage device 14 and/or a printer/output device 16. One or more such storage devices 14 may be utilized, in accordance with the method and system of the present invention, to store the various objects which may be periodically accessed and processed by a user within data processing system 8. Storage device 14 may be virtual in that data and objects represented thereon actually exist and may be common to a server or peer such as server 28 or mainframe 26. The data may reside within storage device 14 or 20. In a manner well known in the prior art, each such data processing procedure or document may be stored within a storage device 14 which is associated with a Resource Manager or Library Service, which is responsible for maintaining and updating all resource objects associated therewith.

Still referring to FIG. 1, it may be seen that data processing system 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10. Mainframe computer 26 may be coupled via communication link 34 to gateway server 28, and via communication link 24 to Local Area Network 10. Gateway server 28 is preferably an individual computer or Intelligent Work Station (IWS) which serves to link Local Area Network (LAN) 32 to Local Area Network (LAN) 10.

Figure 2:
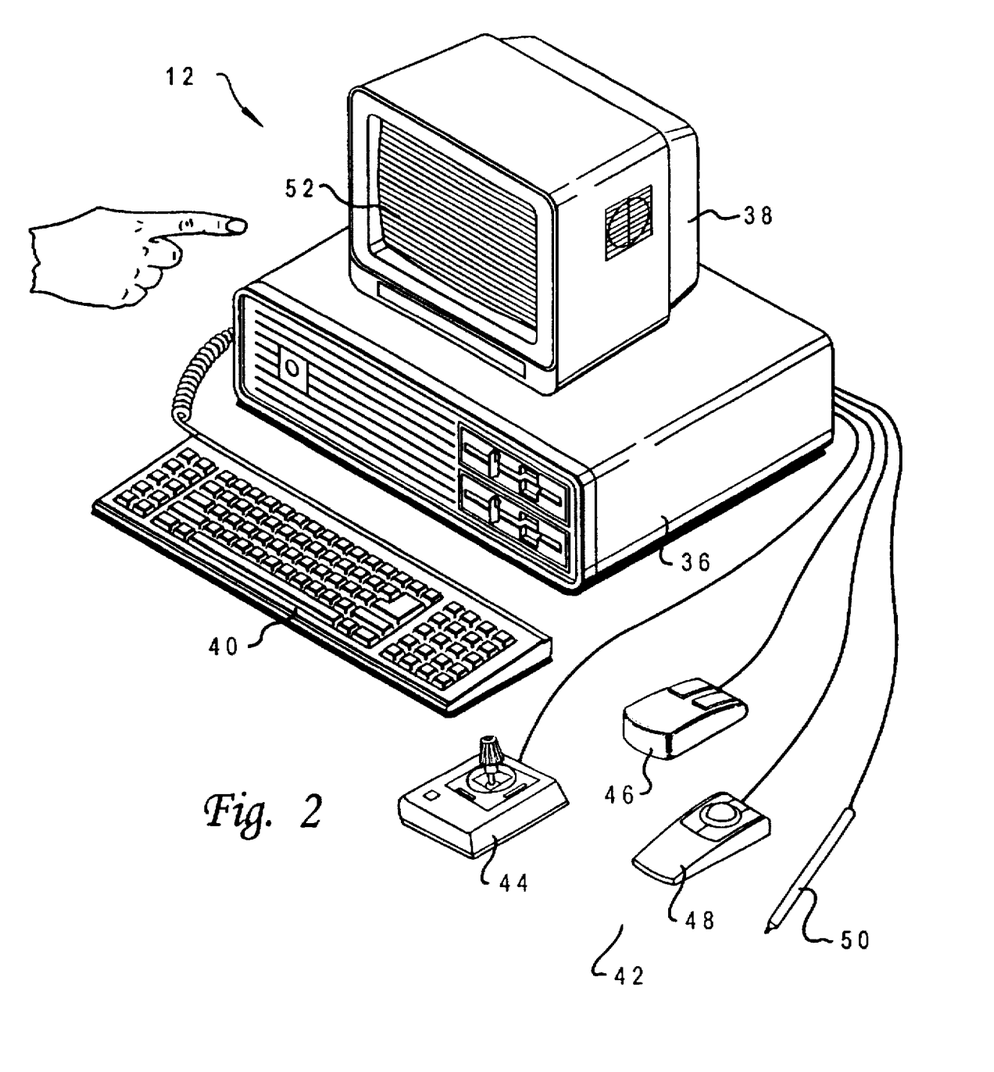
FIG. 2 illustrates a computer system included within data processing system 8 in accordance with the method and system of the present invention.
Figure 3:
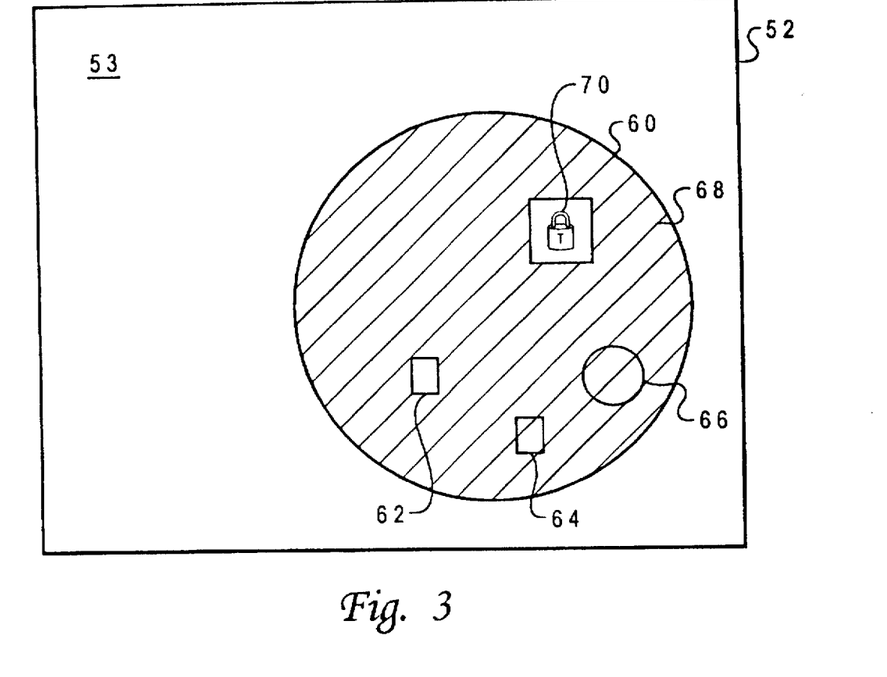
FIG. 3 depicts a pictorial representation of a graphical user interface displayed on a computer display screen including a secured enclosure including displayed objects in accordance with the method and system of the present invention.

With reference now to FIG. 2, there is illustrated a computer system included within data processing system 8 in accordance with the method and system of the present invention. Computer system 12 includes a computer 36, a computer display 38, a keyboard 40, and multiple input pointing devices 42. Those skilled in the art will appreciate that input pointing devices 42 may be implemented utilizing a pointing stick 44, a mouse 46, a track ball 48, a pen 50, a touch display screen 52, or any other device that permits a user to manipulate objects, icons, and other display items in a graphical manner on display screen 52. A graphical user interface 53 may be displayed on screen 52 and manipulated utilizing any input pointing device 42, as shown in FIG. 3.

In accordance with the present invention, a method and system are described for associating and displaying a plurality of objects within a graphical user interface in a data processing system. The objects may be data objects, container objects, files, applications, iconic representations of application, an enclosure such as described herein, or any other type of object which may be manipulated by a user within a graphical user interface. Graphical user interfaces provide ways for users to effectively communicate with the computer. In graphical user interfaces, available applications, data sets, and other objects are often represented by icons which are small graphical representations which may be selected by a user and manipulated. Icons can be activated or selected by moving a mouse-controlled cursor onto the icon and pressing a mouse button. Icons may be represented in two-dimensional, three-dimensional, or virtual reality environments on computer screens, projections displays, or on head-mounted displays.

In a three-dimensional or virtual reality environment, for example, a graphical depiction of a pin may be utilized by a user to "puncture" the translucent surface in order to release the contents of the enclosure so that the contents may be accessed. The surface may be selected in a virtual reality environment utilizing a depiction of a user's hand. A finger of the hand could be pushed into the surface in order to select the enclosure by "puncturing" the surface with the finger.

The present invention provides a method and system for efficiently associating objects determined by a user to be related, and then displaying those objects. A visually perceptible enclosure is provided which is created having a translucent surface. Objects which the user desires to display within the enclosure are specified and associated with the enclosure. The enclosure is then displayed having each specified object displayed within it. The objects are partially obscured by the translucent surface. Objects displayed within the enclosure are not accessible until the enclosure has been removed. When the enclosure is removed, all enclosed objects are fully accessible. The translucent surface may be graphically indicated to a user utilizing a continuous shading, a mesh pattern of lines, or different colors.

When the enclosure is manipulated, each associated object, is indirectly manipulated. For example, the enclosure may be exported from one data processing system to another. When the enclosure is exported, the enclosure is copied from the first data processing system to a second data processing system. In this event, each associated object is exported as part of the enclosure. All objects, such as lock icons, additional enclosures, data objects, applications, which are associated with the enclosure to be exported are copied along with the enclosure. The enclosure may be deleted, which causes the deletion of the objects displayed within the enclosure. When the object to be deleted is an iconic representation of an application, the deletion of the object may delete only the iconic representation, or may delete both the iconic representation and the application which is represented. A default may be selected which indicates whether a deletion of the object will delete only the icon or both the icon and the application.

In one embodiment, the enclosure may have an associated code field. The code field is a field utilized to receive data. The data received by the code field is the code input by a user. Examples of types of codes include textual or numeric codes, or a voice imprint. The enclosure may not be removed until a valid code is entered into the code field. Therefore, the objects displayed within the enclosure cannot be accessed until a valid code is entered into the code field and the enclosure is removed. One example of a code Field would be a field for entering a security clearance code. Once a valid security clearance code is entered, the enclosure is removed and the objects may be accessed. Another example is a credit card, or bank account, code field. In this example, a software provider could package software to be utilized by a purchaser upon the entry of a valid credit card number. Alternatively, an automatic teller machine (ATM) may accept a valid bank account code into the code field.

In one embodiment, the enclosure may include a plurality of areas. A part of the translucent surface of the enclosure is then associated with each area. Objects are then associated with and displayed within one of the areas. Each area is independently accessible. For example, one enclosure could include three areas. Any number and type of objects may be displayed within each area. In order to access a first area, the area must be selected and the surface associated with that area removed. The enclosure would then include only two areas and their associated objects. The objects that had been displayed within the first area are now fully accessible and are no longer associated with the enclosure.

FIG. 3 depicts a pictorial representation of a graphical user interface 53 displayed on a computer display screen 52 including a secured enclosure 62 including displayed objects in accordance with the method and system of the present invention. Objects 62, 64, and 66 are associated with enclosure 60, and are displayed within enclosure 60. Objects 62 and 64 are iconic representations of applications. In order to utilize an application, the iconic representation of that application must be selected. Object 66 is another enclosure, similar to enclosure 60. Object 66 has been minimized to better be displayed. Enclosure 60 includes a translucent, or shaded, surface 68. Surface 68 may be translucent, transparent, or opaque. In the figures, surface 68 is shaded in order to indicate a translucent appearance. Any other type of graphical indication of a particular type of surface may be utilized.

Object 62 is displayed within enclosure 68 but is not covered by translucent surface 68. Object 62 is completely visible. Objects 64 and 66 are displayed within enclosure 68 and are covered by translucent surface 68. Objects 64 and 66 are only partially visible. Access levels have been associated with each object. Object 62 is associated with an access level permitting full access even when object 62 is enclosed within enclosure 60. This access level is depicted by displaying object 62 completely visible, and not covered by translucent surface 68. Objects 64 and 66 are associated with an access level prohibiting any access without first removing enclosure 60 and surface 68. This access level is depicted by displaying objects 64 and 66 shaded by surface 68. Object 62 may be selected by a user and may be fully accessed. While object 62 is being accessed it remains associated with enclosure 60. Objects 64 and 66 may not be accessed when they are displayed within enclosure 60. Different levels of access may be indicated to a user utilizing a particular line pattern, such as a mesh pattern, a particular color, a different shape of object for a different level of access, and any other suitable visual indication.

In order to access objects 64 or 66, surface 68 must be removed. In order to remove surface 68, a user must select enclosure 60 or surface 68. Any suitable method of selecting either enclosure 60 or surface 68 may be utilized. For example, either enclosure 60 or surface 68 may be selected by positioning a cursor, such as a mouse-controlled cursor over either enclosure 60 or surface 68 and clicking a mouse button.

Object 60 includes a "lock" object 70. Lock object 70 provides a graphical indication that object 60 and surface 68 may not be removed unless the user enters a valid code. In order to remove object 60 and surface 68, a user must select lock object 70. When lock object 70 is selected, lock object 70 is no longer displayed and a key object 72 is displayed as depicted in FIG. 4.

Figure 4:
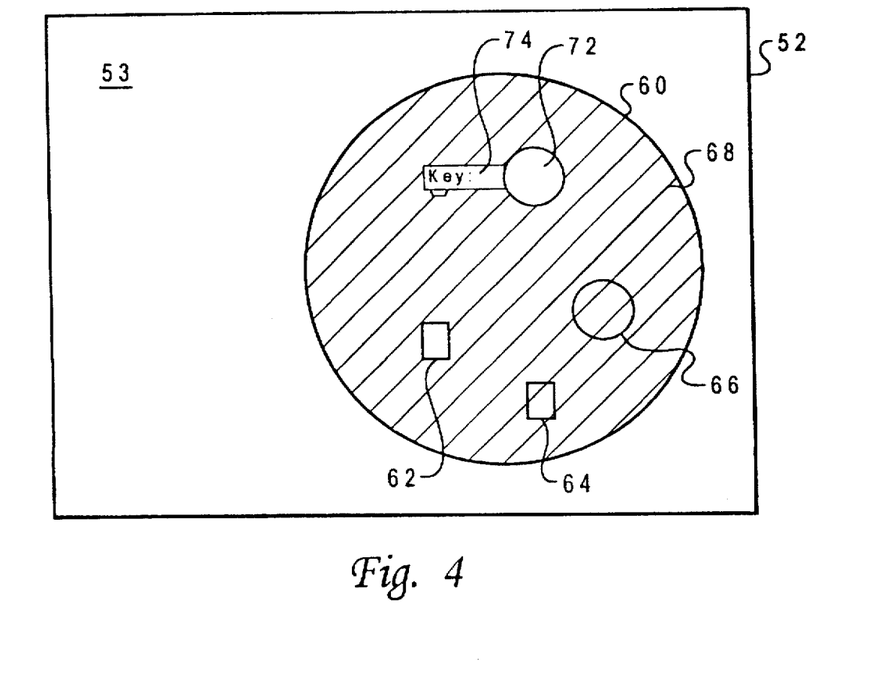
FIG. 4 illustrates a pictorial representation of a graphical user interface displayed on a computer display screen including a secured enclosure having a key object and a code field in accordance with the method and system of the present invention.

FIG. 4 illustrates a pictorial representation of a graphical user interface 53 displayed on a computer display screen 52 including a secured enclosure 60 having a key object 72 and a code field 74 in accordance with the method and system of the present invention. A user must enter a valid code into code field 74 of key object 72. A code may be a security code, a credit card number, or any user created code. If a determination is made that the entered code is valid, enclosure 60 and surface 68 are removed, as depicted in FIG. 5.

Figure 5:
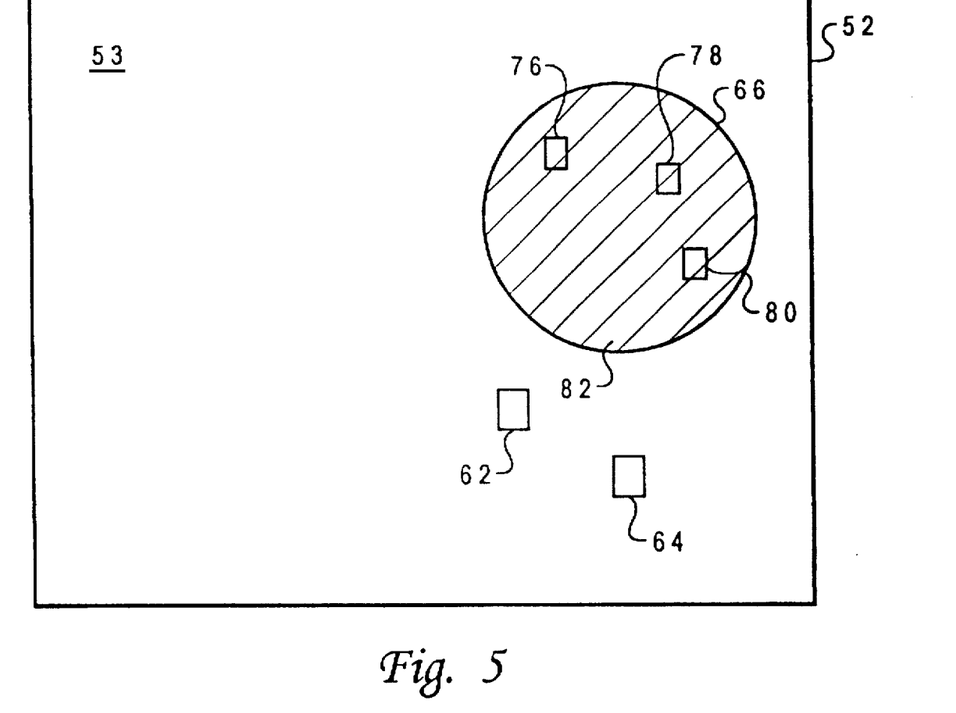
FIG. 5 depicts a pictorial representation of a graphical user interface displayed on a computer display screen including objects previously displayed within an enclosure in accordance with the method and system of the present invention.

FIG. 5 depicts a pictorial representation of a graphical user interface 53 displayed on a computer display screen 52 including objects previously displayed within an enclosure 60 in accordance with the method and system of the present invention. When enclosure 60 and surface 68 are removed, objects 62, 64, and 66 are no longer associated with enclosure 60 and are displayed now in graphical user interface 53. Object 66 is an enclosure and is maximized utilizing any suitable method and system. Object 64 may now be fully accessed. Object 62 remains fully accessible as before. Enclosure 66 includes surface 82, and objects 76, 78, and 80. Objects 76 and 78 may not be accessed until enclosure 66 and surface 82 are removed. Object 80 is fully accessible while remaining associated with enclosure 66.

Figure 6:
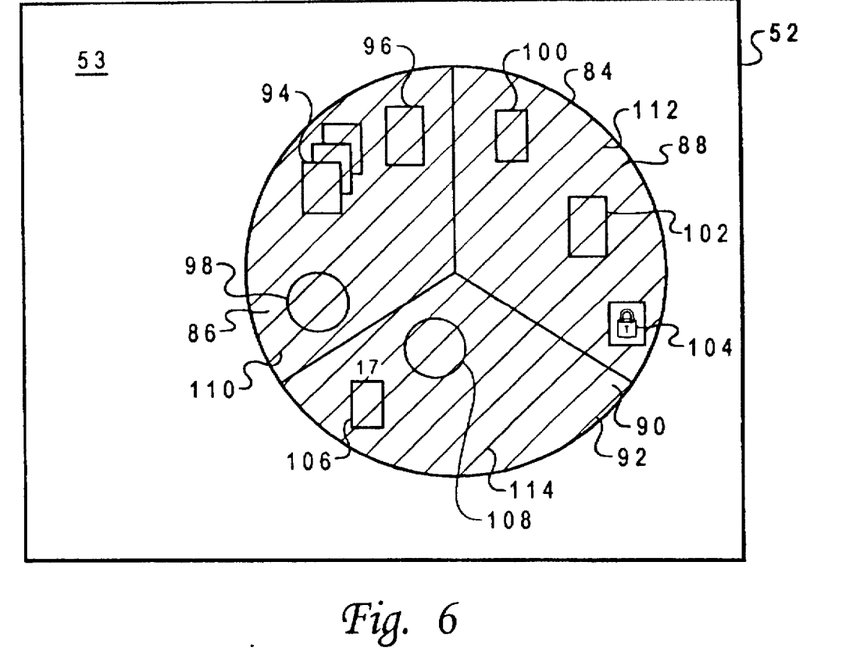
FIG. 6 illustrates a pictorial representation of a graphical user interface displayed on a computer display screen including an enclosure having three areas, where one of the areas is secured in accordance with the method and system of the present invention.

FIG. 6 illustrates a pictorial representation of a graphical user interface 53 displayed on a computer display screen 52 including an enclosure 84 having three areas, where one of the areas is secured in accordance with the method and system of the present invention. As described above, some enclosures may include multiple areas, or compartments. For example, enclosure 84 includes areas 86, 88, and 90. Enclosure 84 and areas 86, 88, and 90 are covered by translucent surface 92. Objects 94, 96, and 98 are associated with and displayed within area 86. Objects 100 and 102 are associated with and displayed within area 88. Area 88 is secured as depicted by lock icon 104. Objects 106 and 108 are associated with and displayed within area 90. Object 106 is displayed with an indication of a number of copies of object 106 which may be accessed. There are 17 copies of object 106 which may be selected.

When a user desires to access any object displayed within enclosure 84, the user must remove the part of surface 92 which covers the area within which the desired object is displayed. Part 110 of surface 92 covers area 86. Part 112 of surface 92 covers area 88. Part 114 of surface 92 covers area 90. In order to access an object displayed within area 88, part 112 must be removed. In order to remove part 112, lock icon 104 must be selected, and a valid code must be entered as described above. Once a valid code is entered, enclosure 84 would include only areas 86 and 90. Objects 100 and 102 are then accessible and are no longer associated with enclosure 84, as depicted in FIG. 7.

Alternatively, instead of utilizing a code field and an entered code, access of the enclosure may be controlled in a three-dimensional or virtual reality environment utilizing a "pin". The pin may be the only method which is utilized to remove the surface of either the entire enclosure or an area of the enclosure. In order to obtain a "pin", or multiple "pins", a user may be required to first supply a valid code. Once the valid code is supplied, a pin, or multiple pins, are associated with the user.

Figure 7:
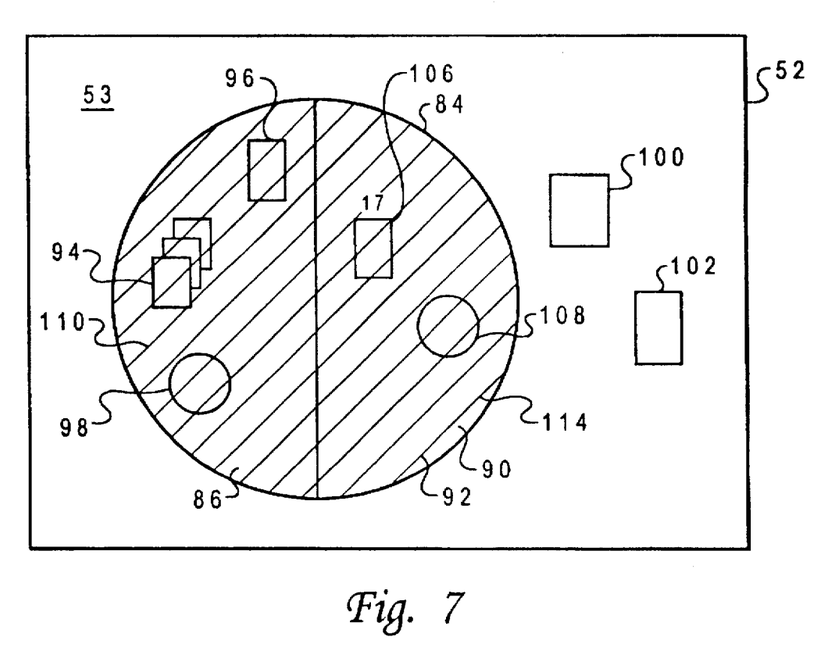
FIG. 7 depicts a pictorial representation of a graphical user interface displayed on a computer display screen including the enclosure of FIG. 6 now having two areas, where the objects displayed within the removed area are now accessible in accordance with the method and system of the present invention.

FIG. 7 depicts a pictorial representation of a graphical user interface 53 displayed on a computer display screen 52 including enclosure 84 of FIG. 6 now having two areas 86 and 90, where objects 100 and 102 displayed within the removed area 88 are now accessible in accordance with the method and system of the present invention.

Figure 8A:
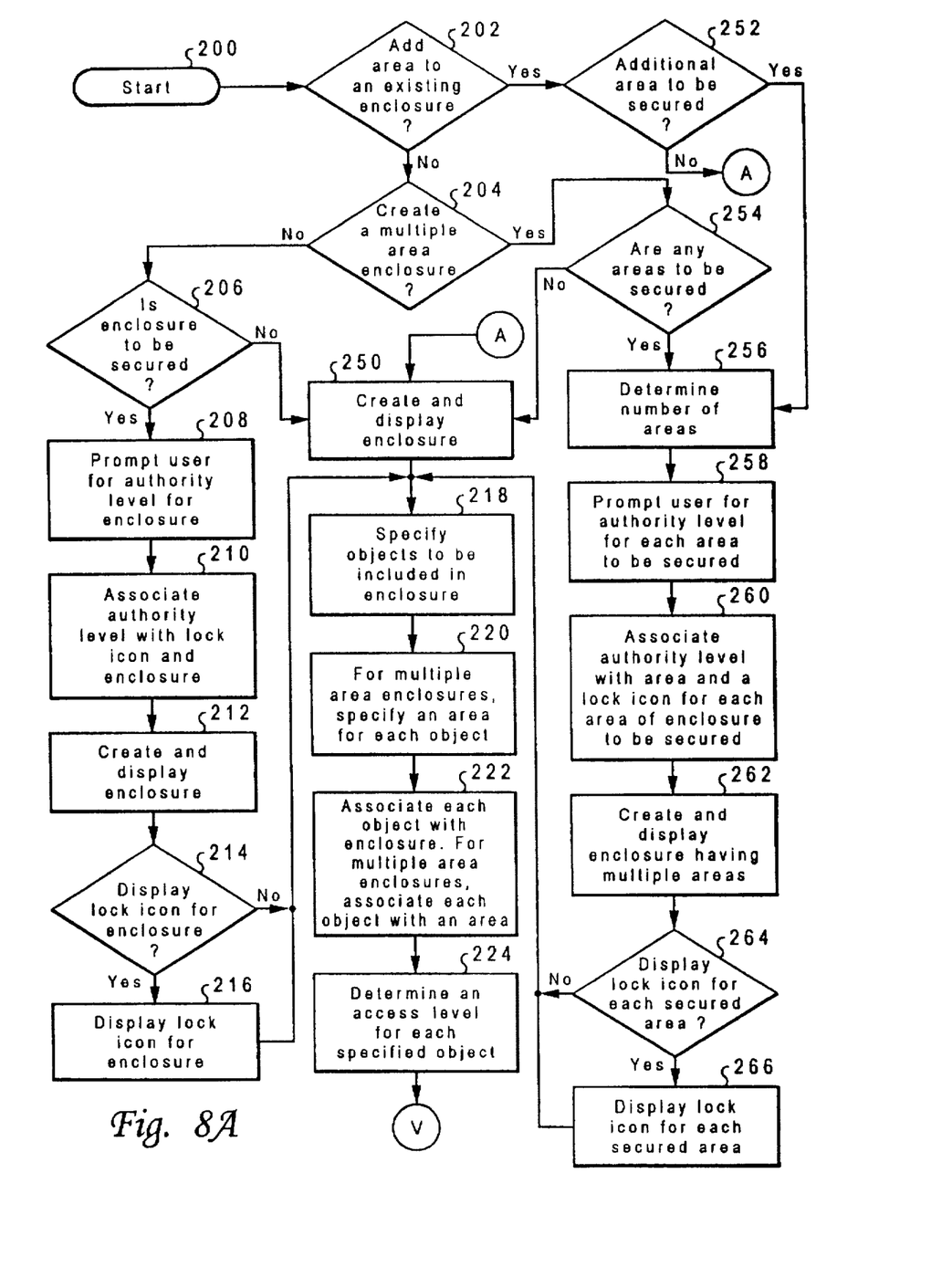
FIGS. 8A and 8B together are a high level flow chart depicting the creation and display of an enclosure and the association and display of objects within the enclosure in accordance with the method and system of the present invention.
Figure 8B:
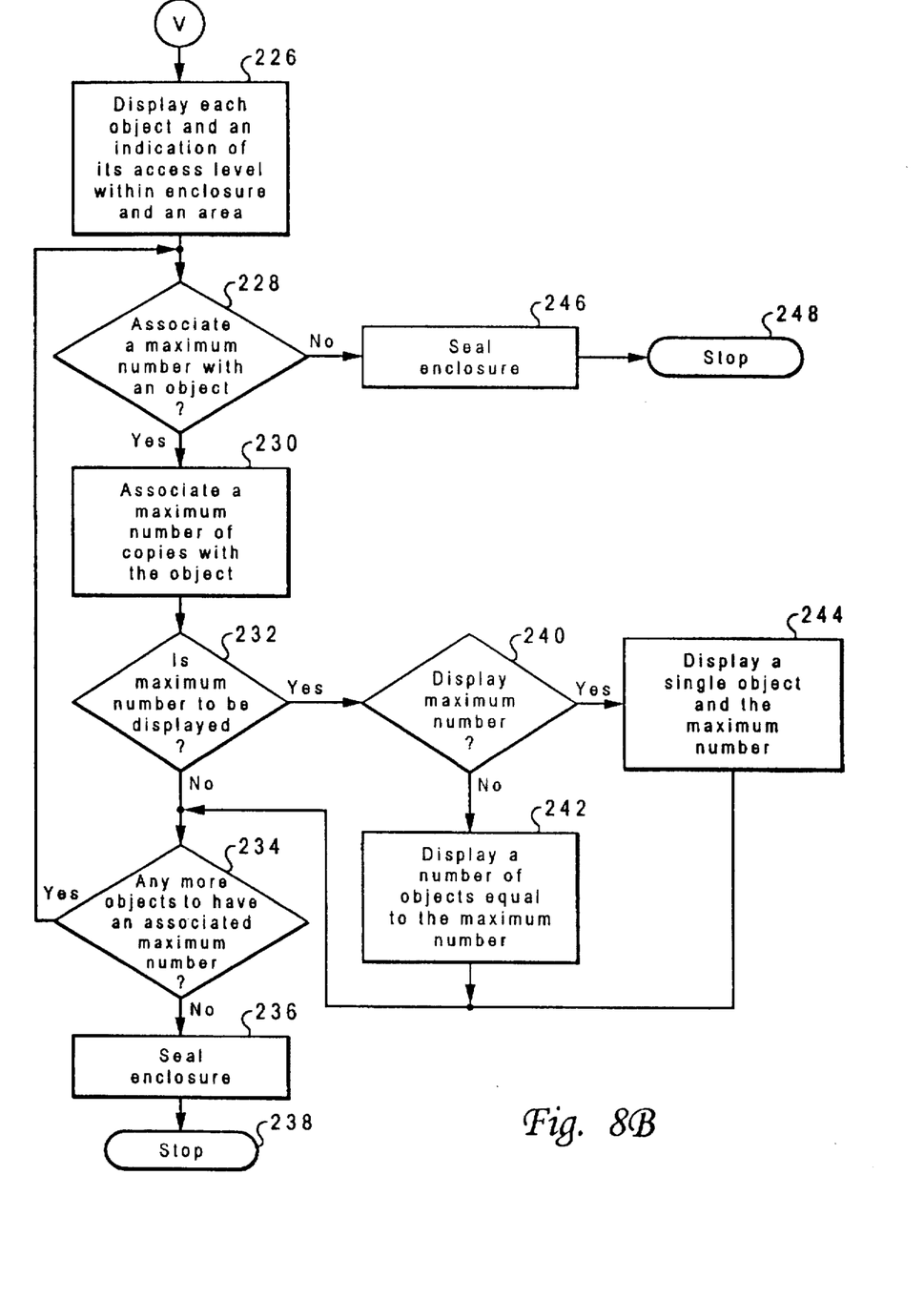

FIGS. 8A and 8B together are a high level flow chart depicting the creation and display of an enclosure and the association and display of objects within the enclosure in accordance with the method and system of the present invention. The process starts as depicted at block 200 and then passes to block 202 which illustrates a determination of whether or not an additional area is to be added to an existing enclosure. If a determination is made that an additional area is not to be added, the process passes to block 204 which illustrates a determination of whether or not a multiple area enclosure is to be created. If a determination is made that a multiple area enclosure is not to be created, the process passes to block 206 which depicts a determination of whether or not the enclosure is to be secured. If a determination is made that the enclosure is to be secured, the process passes to block 208 which illustrates the prompting of the user for an authority level for the enclosure. For example, an authority level may be a valid credit card number, or may be any user which has a particular security clearance or above that clearance.

The process then passes to block 210 which illustrates the association of the authority level with a lock icon and the enclosure. Next, block 212 depicts the creating and displaying of the enclosure. Thereafter, block 214 illustrates a determination of whether or not the lock icon is to be displayed along with the displayed enclosure. If a determination is made that a lock icon is not to be displayed, the process passes to block 218. Referring again to block 214, if a determination is made that the lock icon is to be displayed, the process passes to block 216 which depicts the displaying of the lock icon with the enclosure. Block 218 then illustrates the specification of objects to be included in the enclosure. Next, block 220 depicts the specification of an area for each specified object when the enclosure includes multiple areas. The process then passes to block 222 which illustrates the association of each specified object with the enclosure. For enclosures having multiple areas, each specified object is also associated with one of the areas of the object. Block 224 then illustrates a determination of an access level for each specified object.

The process then passes to block 226 through connector V. Block 226 depicts the displaying of each specified object along with an indication of the objects' access level within the enclosure. For example, an object may be fully accessible even when associated with the enclosure and displayed within the enclosure. An indication of this fully accessible object may be to make the surface over the object transparent while the surface over the rest of the enclosure is translucent. For example, a "help" object might appear transparent and be fully accessible by a user. For enclosures having multiple areas, each object is displayed within its associated area.

Next, the process passes to block 228 which illustrates a determination of whether or not a maximum number is to be associated with a specified object. If a determination is made that a maximum number of copies is to be associated with a specified object, the process passes to block 230 which depicts an association of a maximum number of copies with the object. For example, there may be multiple copies of an object where each copy may be independently selected and concurrently utilized by a number of different users. In this example, there may be only a limited number, i.e. a maximum number, of copies which are available to be utilized concurrently. Software may be sold to users utilizing a license-by-count method. In this method, software may be purchased with an associated maximum number of licenses. For example, a single application may be concurrently accessed and utilized by a limited number of users. Therefore, multiple copies of the object representing the application may be concurrently accessed. Multiple users may concurrently access the software so long as the number of concurrent users does not exceed the limited number, or maximum number, of users associated with the software.

Block 232 illustrates a determination of whether or not an indication of the maximum number is to be displayed. If a determination is made that an indication of the maximum number is not to be displayed, the process passes to block 234 which depicts a determination of whether or not there are any more objects to be associated with a maximum number of copies. The process then passes to block 228. Referring again to block 234, if a determination is made that there are no additional objects to be associated with a maximum number of copies, the process passes to block 236 which illustrates the sealing of the enclosure. The process then terminates as depicted at block 238.

Referring again to block 232, if a determination is made that an indication of the maximum number is to be displayed, the process passes to block 240 which illustrates a determination of whether or not the maximum number is to be displayed as a numeral. If a determination is made that the maximum number is not to be displayed as a numeral, the process passes to block 242 which depicts the displaying of multiple graphical copies of the objects equal to the maximum. The process then passes to block 234. Referring again to block 240, if a determination is made that the maximum number is to be displayed as a numeral, the process passes to block 244 which illustrates the displaying of a single object and the numeral representing the maximum number. The process then passes to block 234.

Referring again to block 228, if a determination is made that a maximum number of is not to be associated with any object, the process passes to block 246 which illustrates the sealing of the enclosure. The process then terminates as illustrated at block 248.

Referring again to block 206, if a determination is made that the enclosure is not to be secured, the process passes to block 250. Block 250 illustrates the creation and display of the enclosure. The process then passes to block 218.

Referring again to block 202, if a determination is made that an area is to be added to an existing enclosure, the process passes to block 252 which illustrates a determination of whether or not the additional area is to be secured. If a determination is made that the additional area is not to be secured, the process passes to block 250 as depicted through connector A. Referring again to block 252, if a determination is made that the additional area is to be secured, the process passes to block 256.

Referring again to block 204, if a determination is made that a multiple area is to be created, the process passes to block 254 which illustrates a determination of whether or not any of the areas are to be secured. If a determination is made that no areas are to be secured, the process passes to block 250. Referring again to block 254, if a determination is made that at least one area is to be secured, the process passes to block 256 which depicts the determination of which areas of the enclosure are to be secured. Thereafter, the process passes to block 258 which depicts the prompting of the user for the authority level for each area to be secured. Next, block 260 illustrates the association of the authority level with the area and a lock icon for each area of enclosure to be secured. The process then passes to block 262 which depicts the creation and displaying of the enclosure and its associated areas. Thereafter, block 264 illustrates a determination of whether or not the lock icon for each secured area is to be displayed. If a determination is made that no lock icons are to be displayed, the process then passes to block 218. Referring again to block 264, if a determination is made that a lock icon is to be displayed for each secured area, the process passes to block 266 which illustrates the displaying of the lock icon for each secured area. Thereafter, the process passes to block 218.

Figure 9A:
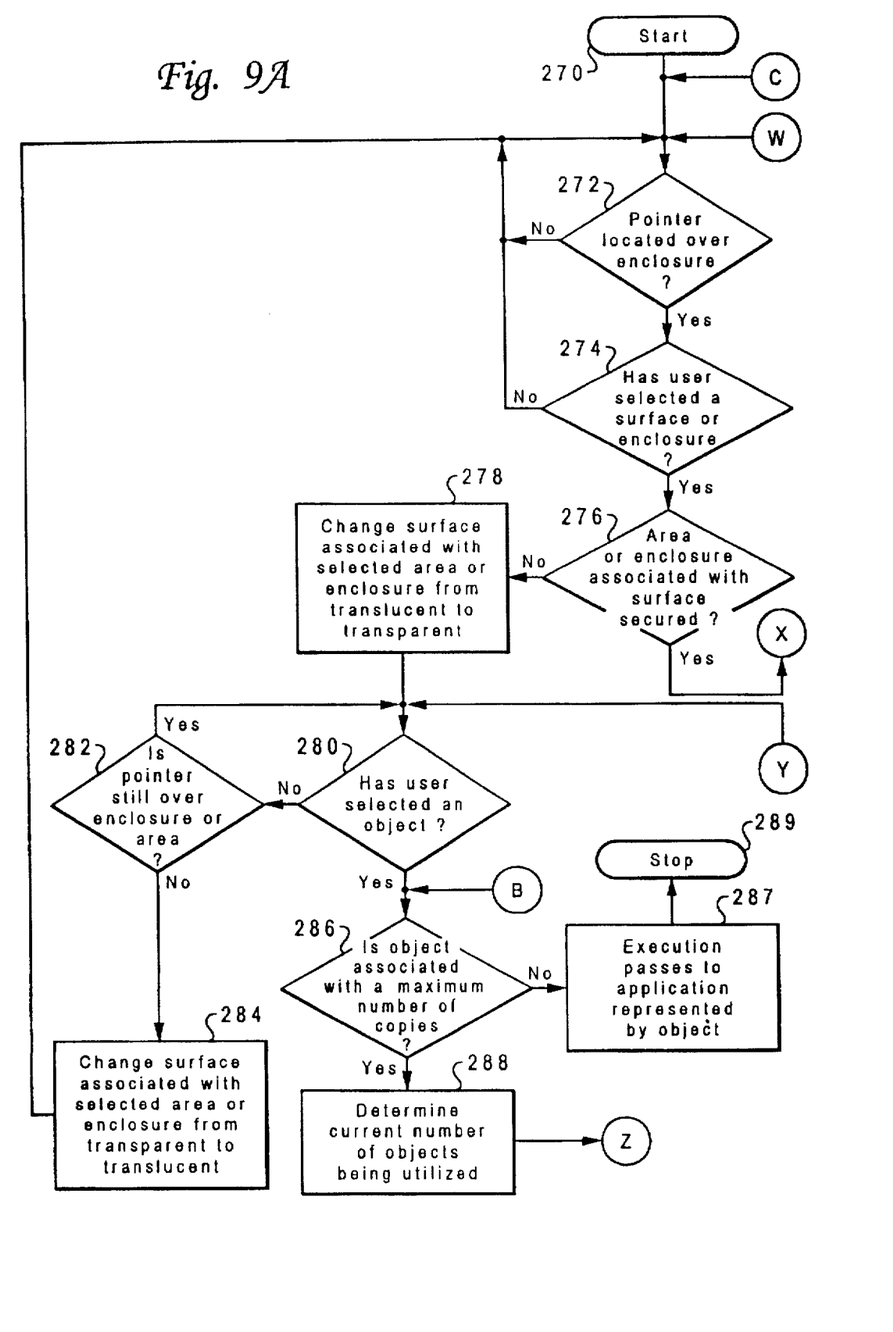
FIGS. 9A, 9B, and 9C together are a high level flow chart illustrating the accessing of an enclosure and its associated objects in accordance with the method and system of the present invention.
Figure 9B:
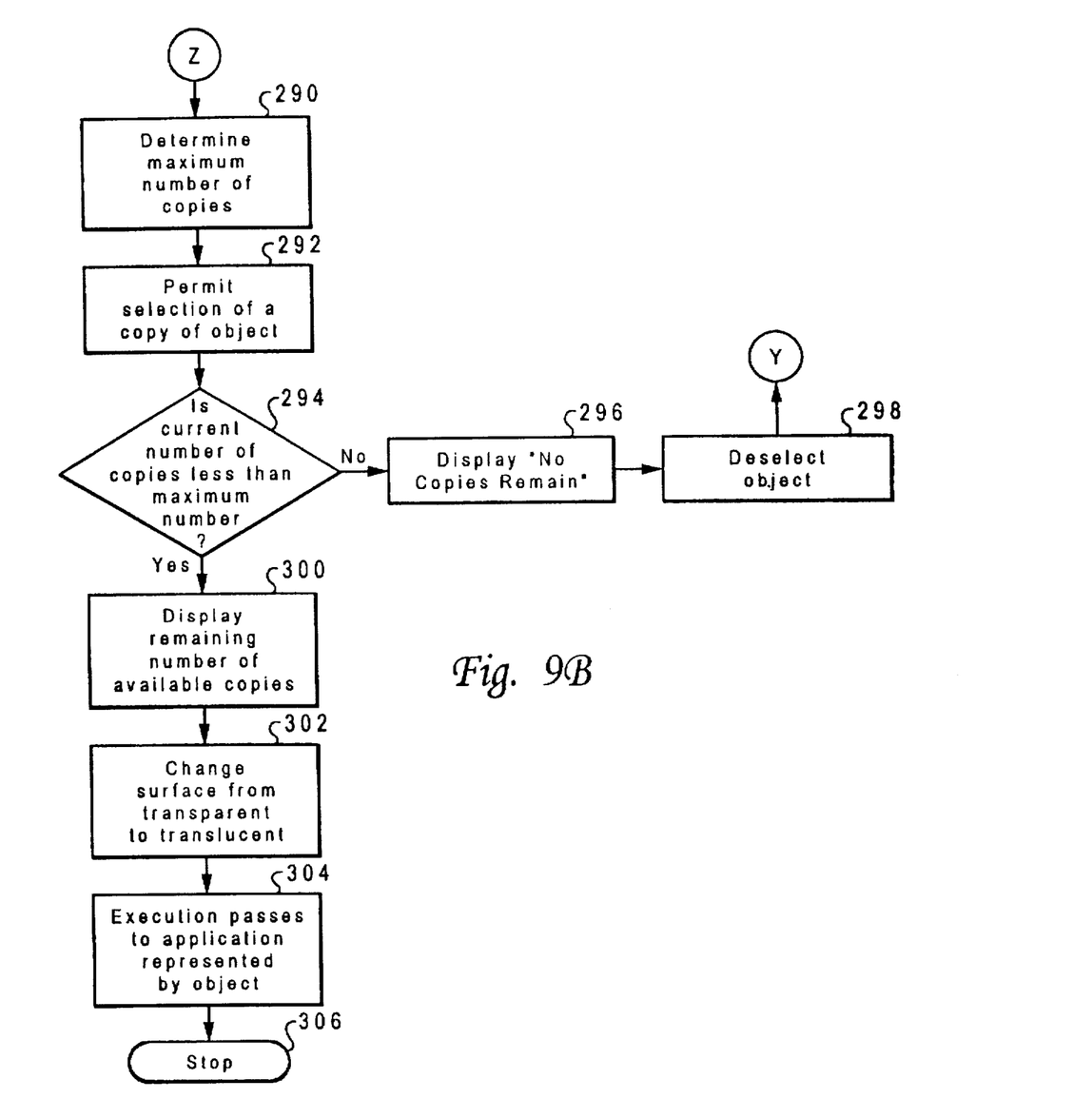
Figure 9C:
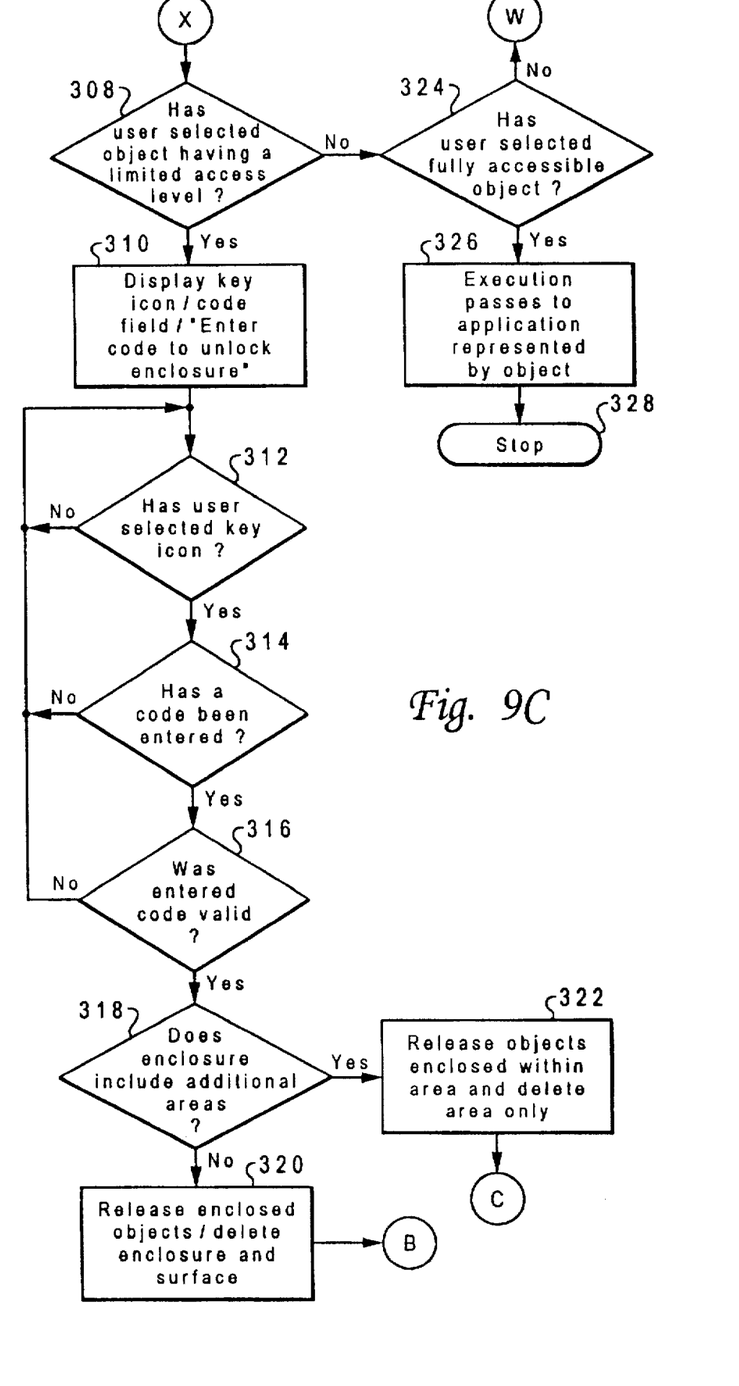

FIGS. 9A, 9B, and 9C are a high level flow chart illustrating the accessing of an enclosure and its associated objects in accordance with the method and system of the present invention. The process starts as depicted at block 270 and then passes to block 272 which illustrates a determination of whether or not a cursor or pointer is located over an enclosure. If a determination is made that the pointer is not located over the enclosure, the process passes back to block 272. If a determination is made that the pointer is located over the enclosure, the process passes to block 274 which depicts a determination of whether or not a user has selected a surface or the enclosure. Either the surface of an enclosure or the enclosure itself may be selected. If a determination is made that neither the surface nor the enclosure have been selected, the process passes to block 272.

Referring again to block 274, if a determination is made that a user has selected either the surface or the enclosure, the process passes to block 276 which illustrates a determination of whether or not an area or the enclosure associated with the selected surface is secured. If a determination is made that the selected surface is not secured, the process passes to block 278 which illustrates the changing of the surface associated with the selected area or enclosure from translucent to transparent. Next, block 280 illustrates a determination of whether or not the user has selected an object which was associated with the selected area or enclosure. If a determination is made that the user has not selected an object, the process passes to block 282 which depicts a determination of whether or not the pointer is still over the enclosure or area. If a determination is made that the pointer is still located over the enclosure or area, the process passes back to block 280. Referring again to block 282, if a determination is made that the pointer is not located over the area or enclosure, the process passes to block 284 which illustrates the changing of the surface associated with the selected area or enclosure from transparent to translucent. The process then passes to block 272.

Referring again to block 280, if a determination is made that the user has selected an object, the process passes to block 286 which depicts a determination of whether or not the selected object is associated with a maximum number of copies. If a determination is made that the object is not associated with a maximum number of copies, the process passes to block 287 which illustrates passing the execution to the application which is represented by the object. The process then terminates as illustrated at block 289.

Referring again to block 286, if a determination is made that the selected object is associated with a maximum number of copies, the process passes to block 288 which illustrates a determination of the current number of objects being utilized. Next, the process passes to block 290 through connector Z. Block 290 depicts a determination of the maximum number of copies. Block 292 illustrates permitting a selection of another copy of the object. Thereafter, block 294 depicts a determination of whether or not the current number of copies being utilized is less than the maximum number. If a determination is made that the current number of copies being utilized is not less than the maximum number, the process passes to block 296, which illustrates the displaying of a message: "No Copies Remain". Next, block 298 depicts the deselection of the object. The process passes back to block 280.

Referring again to block 294, if a determination is made that the current number of copies being utilized is less than the maximum number, the process passes to block 300 which illustrates the displaying an indication of the remaining number of available copies. Next, block 302 depicts the changing the surface from transparent to translucent. Block 304 illustrates passing the execution to the application represented by the object. The process then terminates as illustrated at block 306.

Referring again to block 276, if a determination is made that the area or enclosure associated with the selected surface is secured, the process passes to block 308 through connector X. Block 308 illustrates a determination of whether or not a user has selected an object having limited access level. As described above, objects associated having a limited access may be shaded, or appear underneath the surface of the enclosure or area. If a determination is made that the object does have limited access, the process passes to block 310 which illustrates the displaying of the key icon having a code field and a message: "Enter code to unlock enclosure or area".

Thereafter, block 312 depicts a determination of whether or not the user has selected the key icon. If a determination is made that the key icon has not been selected, the process passes back to block 312.. If a determination is made that the key icon has been selected, the process passes to block 314 which depicts a determination of whether or not a code has been entered. If a determination is made that a code has not been entered, the process passes back to block 312. Referring again to block 314, if a determination is made that a code has been entered, the process passes to block 316 which depicts a determination of whether or not a valid code has been entered. If a determination is made that a valid code has not been entered, the process back to block 312. Referring again to block 316, if a determination is made that a valid code has been entered, the process passes to block 318 which depicts a determination of whether or not the enclosure includes additional areas. If a determination is made that the enclosure does not include additional areas, the process passes to block 320 which illustrates the releasing of the enclosed object and the deletion of the enclosure and its surface. The process then passes to block 286 as illustrated through connector B. Referring again to block 318, if a determination is made that the enclosure does include additional areas, the process passes to block 322 which depicts the releasing of the objects enclosed within the area and the deletion of the area and the part of the enclosure associated with the area. The process then passes to block 272 as illustrated through connector C.

Referring again to block 308, if a determination is made that the user has not selected an object with a limited access level, the process passes to block 324 which depicts a determination of whether or not the user has selected an object which is fully accessible. If a determination is made that the user has not selected an object which is fully accessible, the process passes to block 272 through connector W. Referring again to block 324, if a determination is made that the user has selected a fully accessible object, the process passes to block 326 which illustrates passing the execution to the application represented by the object. The process then terminates as illustrated at block 328.

Figure 10:
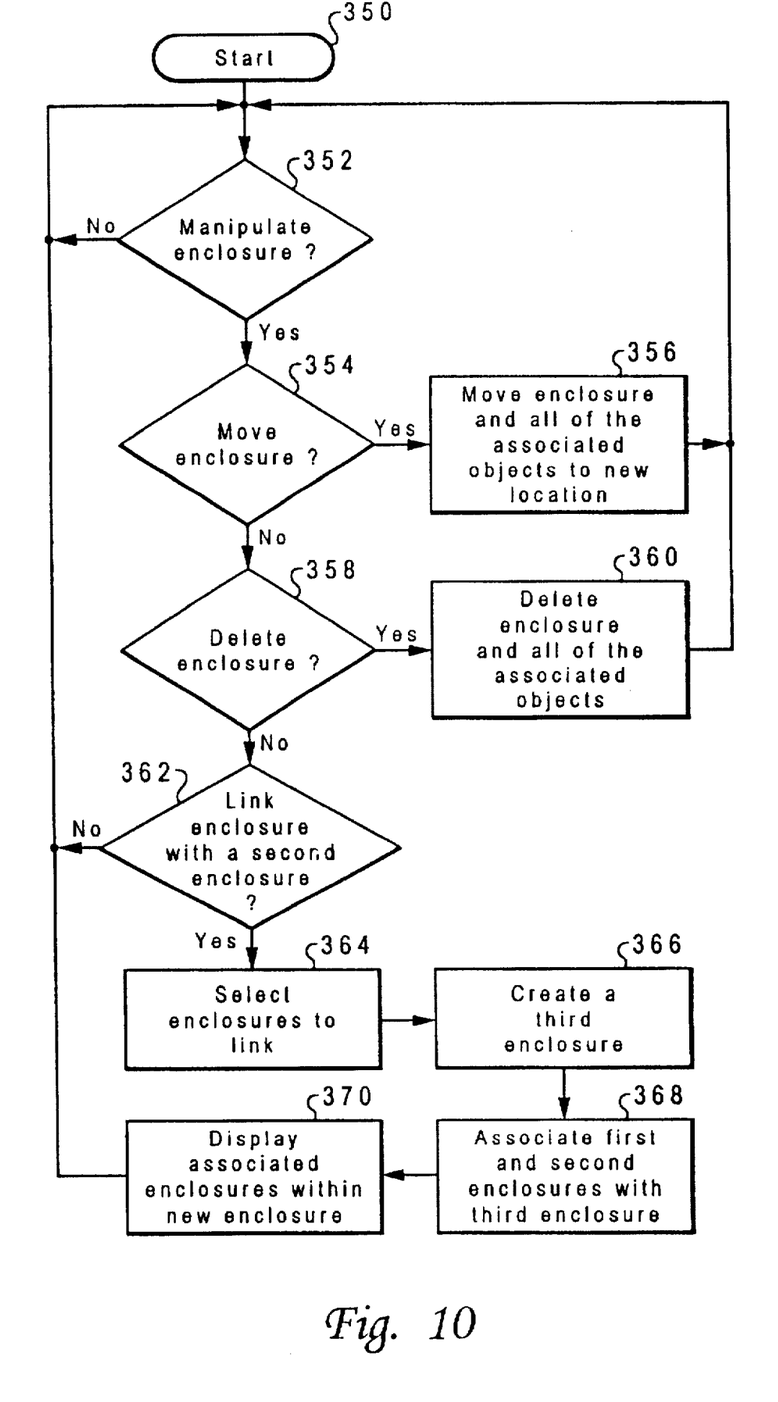
FIG. 10 is a high level flow chart depicting the manipulation of an enclosure and its associated objects in accordance with the method and system of the present invention.

FIG. 10 is a high level flow chart depicting the manipulation of an enclosure and its associated objects in accordance with the method and system of the present invention. The process starts as depicted at block 350 and then passes to block 352 which illustrates a determination of whether the enclosure is to be manipulated. If a determination is made that the enclosure is not to be manipulated, the process passes to block 352. Referring again to block 352, if a determination is made that the enclosure is to be manipulated, the process passes to block 354 which depicts a determination of whether the enclosure is to be moved. If a determination is made that the enclosure is to be moved, the process passes to block 356 which illustrated the movement of the enclosure and all of the objects associated with the object to the new location. The process then passes to block 352.

Referring again to block 354, ifa determination is made that the enclosure is not to be moved, the process passes to block 358 which illustrates a determination of whether or not the enclosure is to be deleted. If a determination is made that the enclosure is to be deleted, the process passes to block 360 which illustrates a deletion of the enclosure and all of the objects associated with the enclosure. The process then passes to block 352.

Referring again to block 358, if a determination is made that the enclosure is not to be deleted, the process passes to block 362. Block 362 illustrates a determination of whether or not another enclosure is to be linked with the enclosure. If a determination is made that a second enclosure is not to be linked with the first enclosure, the process passes back to block 352. Referring again to block 362, if a determination is made that a second enclosure is to be linked with the first enclosure, the process passes to block 364 which depicts the selection of a second enclosure. Next, block 366 illustrates the creation of a new, third, enclosure. Block 368 then illustrates the association of the first and second enclosures with the third enclosure. Thereafter, block 370 depicts the displaying of the third enclosure having the first and second enclosures displayed within the third enclosure. The process then passes to block 352.

While the invention has been particularly shown and described with reference to a preferred embodiment, it will be understood by those skilled in the art that various changes in form and detail may be made therein without departing from the spirit and scope of the invention.

We claim:

1. A method in a graphical user interface in a data processing system for associating and displaying a plurality of objects, said method comprising the steps of:

specifying a creation of a visually perceptible enclosure having a translucent surface;

specifying said plurality of objects within said graphical user interface;

associating each of said plurality of objects with said visually perceptible enclosure;

creating said enclosure; and displaying said enclosure and each of said plurality of objects within said graphical user interface, each of said plurality of objects being displayed within said enclosure so that each of said plurality of objects is partially visible through said translucent surface.

2. The method according to claim 1 further comprising the step of each of said plurality of objects being inaccessible while being displayed within said enclosure.

3. The method according to claim 2 further comprising the steps of:

associating one of a plurality of access levels with each of said plurality of objects; and displaying an indication of said one of said plurality of access levels for each of said plurality of objects.

4. The method according to claim 3 further comprising the step of associating a first of said plurality of access levels with a first of said plurality of objects, said first of said plurality of objects being fully accessible while being displayed within said enclosure.

5. The method according to claim 4 further comprising the step of associating a second of said plurality of access levels with a second of said plurality of objects, said second of said plurality of objects being inaccessible while being displayed within said enclosure.

6. The method according to claim 5 further comprising the step of removing said enclosure and said surface from said graphical user interface, wherein each of said plurality of objects are no longer associated with said enclosure and said plurality of objects are accessible.

7. The method according to claim 6 further comprising the steps of:

determining a maximum number of copies of a third of said plurality of objects which may be concurrently utilized;

determining a number of copies of said third of said plurality of objects which are being utilized;

upon a selection of a copy of said third of said plurality of objects, if said number is less than said maximum number, permitting access to said copy; and upon a selection of a copy of said third of said plurality of objects, if said number is not less than said maximum number, prohibiting access to said copy.

8. The method according to claim 6 further comprising the step responsive to a user selection of exporting said enclosure from said data processing system to a second data processing system, wherein each of said plurality of objects are exported when said enclosure is exported.

9. The method according to claim 1 further comprising the steps of:

associating a code field with said visually perceptible enclosure;

selecting said enclosure;

in response to an entry of a code into said code field; determining whether said code is valid;

in response to said code being invalid, prohibiting access of each of said plurality of objects; and in response to said code being valid, removing said enclosure and said surface while continuing to display each of said plurality of objects so that access of each of said plurality of objects is permitted.

10. The method according to claim 1 further comprising the steps of:

said visually perceptible enclosure having a plurality of areas, each of said plurality of areas having a part of said translucent surface;

for each of said plurality of areas, associating at least one of said plurality of objects with said each of said plurality of areas;

associating one of a plurality of code fields with each of said plurality of areas;

selecting one of said plurality of areas, wherein said one of said plurality of areas is associated with one of said plurality of objects;

in response to an entry of a code into a first code field associated with said one of said plurality of areas, determining whether said code is valid;

in response to said code being invalid, prohibiting access of said at least one of said plurality of objects associated with said one of said plurality of areas; and in response to said code being valid, removing said part of said surface of said one of said plurality of areas while continuing to display said at least one of said plurality of objects so that access of said at least one of said plurality of objects is permitted.

11. A data processing system having a graphical user interface for associating and displaying a plurality of objects, comprising:

means for specifying a creation of a visually perceptible enclosure having a translucent surface;

means for specifying said plurality of objects within said graphical user interface;

means for associating each of said plurality of objects with said visually perceptible enclosure;

means for creating said enclosure; and means for displaying said enclosure and each of said plurality of objects within said graphical user interface, each of said plurality of objects being displayed within said enclosure so that each of said plurality of objects is partially visible through said translucent surface.

12. The system according to claim 11 further comprising means for each of said plurality of objects being inaccessible while being displayed within said enclosure.

13. The system according to claim 12 further comprising:

means for associating one of a plurality of access levels with each of said plurality of objects; and means for displaying an indication of said one of said plurality of access levels for each of said plurality of objects.

14. The system according to claim 13 further comprising means for associating a first of said plurality of access levels with a first of said plurality of objects, said first of said plurality of objects being fully accessible while being displayed within said enclosure.

15. The system according to claim 14 further comprising means for associating a second of said plurality of access levels with a second of said plurality of objects, said second of said plurality of objects being inaccessible while being displayed within said enclosure.

16. The system according to claim 15 further comprising means for removing said enclosure and said surface from said graphical user interface, wherein each of said plurality of objects are no longer associated with said enclosure and said plurality of objects are accessible.

17. The system according to claim 16 further comprising:

means for determining a maximum number of copies of a third of said plurality of objects which may be concurrently utilized;

means for determining a number of copies of said third of said plurality of objects which are being utilized;

means for upon a selection of a copy of said third of said plurality of objects, if said number is less than said maximum number, permitting access to said copy; and means for upon a selection of a copy of said third of said plurality of objects, if said number is not less than said maximum number, prohibiting access to said copy.

18. The system according to claim 16 further comprising means responsive to a user selection for exporting said enclosure from said data processing system to a second data processing system, wherein each of said plurality of objects are exported when said enclosure is exported.

19. The system according to claim 11 further comprising:

means for associating a code field with said visually perceptible enclosure;

means for selecting said enclosure;

means for in response to an entry of a code into said code field; determining whether said code is valid;

means for in response to said code being invalid, prohibiting access of each of said plurality of objects; and means for in response to said code being valid, removing said enclosure and said surface while continuing to display each of said plurality of objects so that access of each of said plurality of objects is permitted.

20. The system according to claim 11 further comprising:

said visually perceptible enclosure having a plurality of areas, each of said plurality of areas having a part of said translucent surface;

for each of said plurality of areas, means for associating at least one of said plurality of objects with said each of said plurality of areas;

means for associating one of a plurality of code fields with each of said plurality of areas;

means for selecting one of said plurality of areas, wherein said one of said plurality of areas is associated with one of said plurality of objects;

means for in response to an entry of a code into a first code field associated with said one of said plurality of areas, determining whether said code is valid;

means for in response to said code being invalid, prohibiting access of said at least one of said plurality of objects associated with said one of said plurality of areas; and means for in response to said code being valid, removing said part of said surface of said one of said plurality of areas while continuing to display said at least one of said plurality of objects so that access of said at least one of said plurality of objects is permitted.

* * * * *